United States Patent [19]

Sjöö et al.

[11] Patent Number: 5,669,742

[45] Date of Patent: Sep. 23, 1997

[54] TOOL HOLDER FOR THE CLAMPING OF CUTTING INSERTS

[75] Inventors: Sture Sjöö, Gävle; Håkan Ericksson, Kungsgården, both of Sweden

[73] Assignee: Sandvik Aktiebolag, Sandviken, Sweden

[21] Appl. No.: 630,327

[22] Filed: Apr. 10, 1996

[30] Foreign Application Priority Data

Apr. 11, 1995 [SE] Sweden .................. 9501341

[51] Int. Cl.$^6$ .................. B23B 29/04; B23B 27/16
[52] U.S. Cl. .................. 407/105; 407/108
[58] Field of Search .................. 407/101, 103–106, 407/108

[56] References Cited

U.S. PATENT DOCUMENTS

| | | | |
|---|---|---|---|
| 3,192,602 | 7/1965 | Copeland | 407/103 |
| 3,339,256 | 9/1967 | Melinder | 407/103 |
| 3,905,081 | 9/1975 | Wirfelt | 407/103 |
| 4,334,807 | 6/1982 | Nessel | 407/103 |
| 5,586,844 | 12/1996 | Nyman | 407/105 |

*Primary Examiner*—Daniel W. Howell
*Assistant Examiner*—Kenneth S. Hansen
*Attorney, Agent, or Firm*—Burns, Doane, Swecker & Mathis, L.L.P.

[57] ABSTRACT

A tool holder has a insert-support surface and a wedge-support surface. A pin projects upwardly from the insert-support surface and enters a through-hole of a cutting insert that is seated on the insert-support surface. The wedge-support surface includes a front portion disposed adjacent the insert-support surface and a rear portion extending upwardly from the front portion at an inclination. A wedge contacts both of the front and rear portions and is secured by a fastening screw which passes through the wedge and enters the front portion. The wedge includes a front insert-engaging bulge, and a lower heel which contacts the front portion and defines a pivot axis which is located closer to the pin than is the bulge. Upon tightening of the screw, the wedge is (a) pushed toward the insert by the rear portion of the wedge-support surface to push the insert against the pin, and (b) caused to pivot about the pivot axis in a direction producing a slight downward movement of the bulge.

8 Claims, 5 Drawing Sheets

5,669,742

1

TOOL HOLDER FOR THE CLAMPING OF CUTTING INSERTS

BACKGROUND OF THE INVENTION

The invention relates to a clamping arrangement for cutting inserts comprising an insert seat against which a support surface of the insert bears. Projecting upwardly from the seat is a pin which enters an insert hole of a clamped cutting insert, such as an indexable cutting insert or a threading cutting insert. The clamping arrangement comprises a clamping device in the form of a tensioning wedge, which is brought to press against one of the flank surfaces of the cutting insert, thereby clamping the cutting insert against the pin.

Different types of wedge clamping arrangements exist and these are usually characterized by the fact that the abutment surface of the wedge which presses against the cutting insert is moved downwardly toward the support surface of the cutting insert during tightening of a fastening screw. Such arrangements are for instance disclosed in SE-C-334 789, U.S. Pat. No. 3,192,602, U.S. Pat. No. 3,339,256 and U.S. Pat. No. 4,334,807. Although the movement direction of the wedge is qualitatively correct, it is quantitatively too large. Thus, the cutting insert is pressed down too much at its rear end, which is undesirable since at the slightest unevenness, the insert may easily tip somewhat, so that its front part is lifted from its support. When this occurs, vibrations and breakages can easily occur.

In order to avoid the above-mentioned inconveniences, a wedge clamping arrangement is suggested in U.S. Pat. No. 3,905,081 (Wirfelt), according to which the abutment surface of the wedge against the cutting insert does not move downwardly but rather slightly upwardly during tightening. However, in practice also this has turned out to be unsatisfactory, because the insert is lifted somewhat at its rear, producing a gap between the support surface of the insert and the support surface of the insert seat. Again, vibrations and breakage may then easily be caused.

SUMMARY OF THE INVENTION

A primary object of the present invention is thus to achieve a completely play- or gap-free abutment between the support surface of a cutting insert and the support surface of the insert seat.

In other terms, the primary object of the present invention is to obtain an abutment between the support surface of a cutting insert and the support surface of the seat, without the insert being lifted up either at its front, or at its rear.

These and further objects have been attained by a tool holder for cutting inserts. The tool holder comprises a body, a pin, and a wedge. The body forms an insert-support surface adapted to support a cutting insert, and a wedge-support surface adapted to support the wedge. The wedge-support surface includes a front portion disposed adjacent the insert-support surface, and a rear portion extending upwardly at an obtuse angle relative to the front portion. The pin projects upwardly from the insert-support surface and is adapted to enter a through-hole of a cutting insert. The rear portion of the wedge-support surface faces generally toward the pin. The wedge is supported by the wedge-support surface and includes a through-hole receiving a fastening screw which secures the wedge to the front portion of the wedge-support surface. The wedge includes a rear contact surface abutting the rear portion of the rear-support surface to cause the wedge to be displaced toward the pin when the fastener screw is tightened. The wedge includes a front contact

2 surface disposed opposite the rear contact surface. The front contact surface includes an insert-engaging portion for abutting and pushing an insert against the pin. The front contact portion also includes a supporting heel for abutting the front portion of the wedge-support surface at a location which is disposed closer to an axis of the pin than is the insert-engaging portion.

Preferably, the insert-engaging portion comprises a curved bulge.

The supporting heel preferably includes a lower edge abutting the front portion of the wedge-support surface.

The pin preferably includes a portion that becomes wider in an upward direction and is adapted to engage a correspondingly shaped portion of an insert hole.

The invention also includes the combination of the above-described tool holder and a cutting insert, wherein the wedge bears against the cutting insert at a location situated above a location where the insert contacts the pin.

BRIEF DESCRIPTION OF THE DRAWINGS

For illustrative but non-limiting purposes, the invention will now be further described with reference to the preferred embodiments as shown in the drawings. The drawings are herewith briefly presented.

DETAILED DESCRIPTION OF PREFERRED EMBODIMENTS OF THE INVENTION

In the figures an embodiment is shown relating to a threading insert 1. The insert has a triangular basic shape, and is made of coated or uncoated cemented carbide. This threading insert is fastened to an insert seat which includes an insert-support surface 34 formed in a body of an insert tool holder 2. This holder has the shape of a turning bar, but in principle, the invention can also be applied to other types of cutting machining, such as milling and drilling, and thus would be used with cutting inserts other than the one illustrated. The holder includes a wedge-support surface including rear and front portions 20 and 21.

Figure 1:
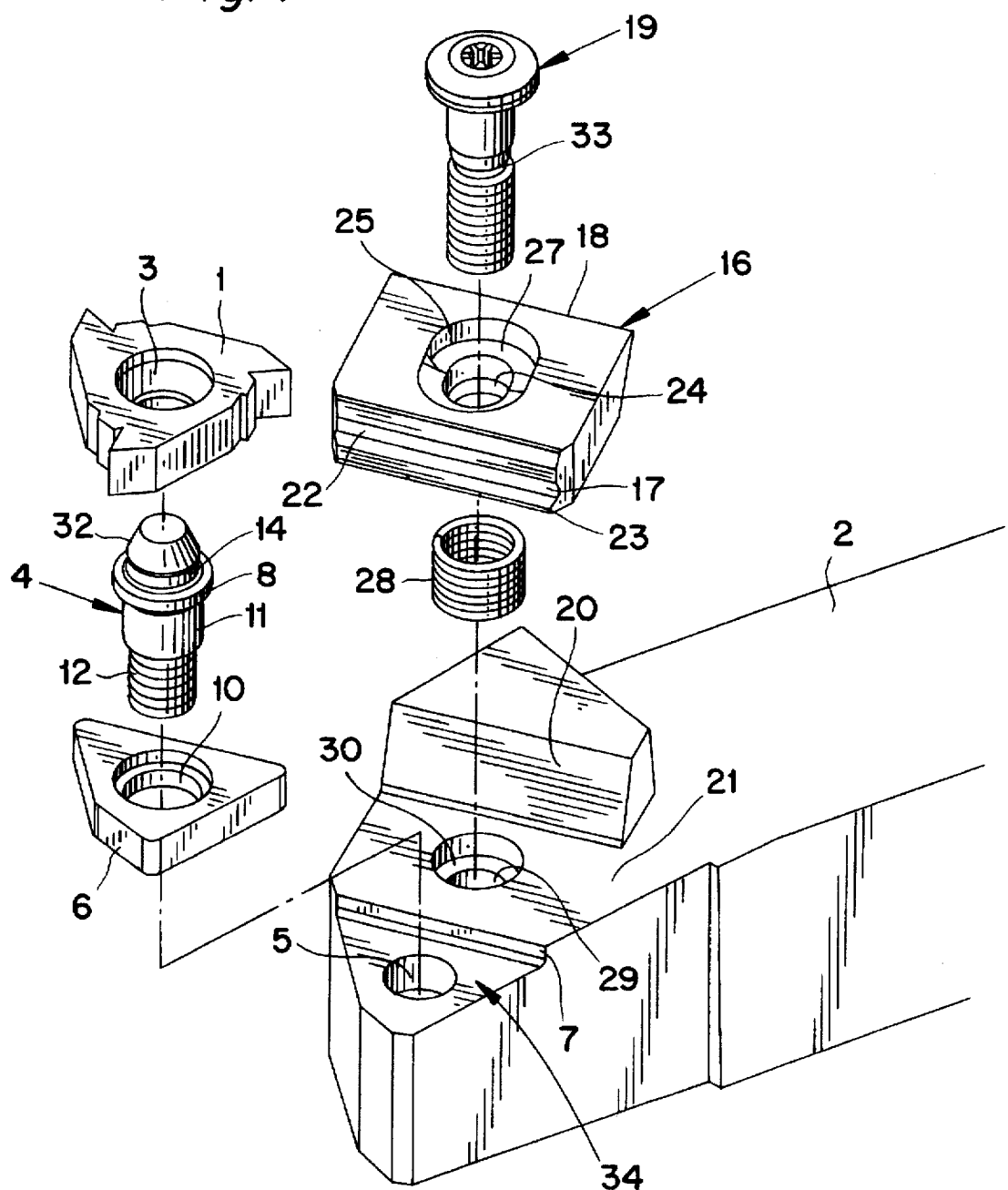
FIG. 1 shows an exploded view of a first embodiment of the invention, in a perspective obliquely from above.
Figure 2:
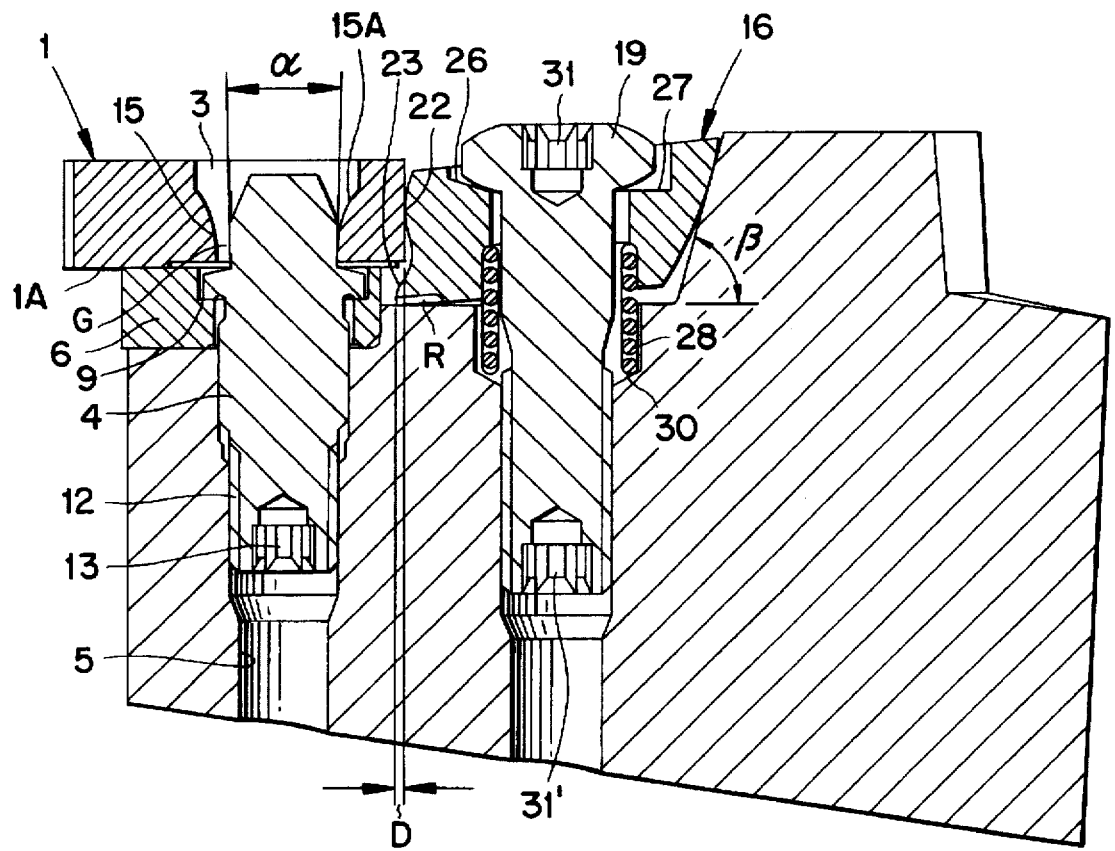
FIG. 2 shows a cross-section of the embodiment according to FIG. 1 taken along a plane containing the central axes of the two locking pins.
Figure 3:
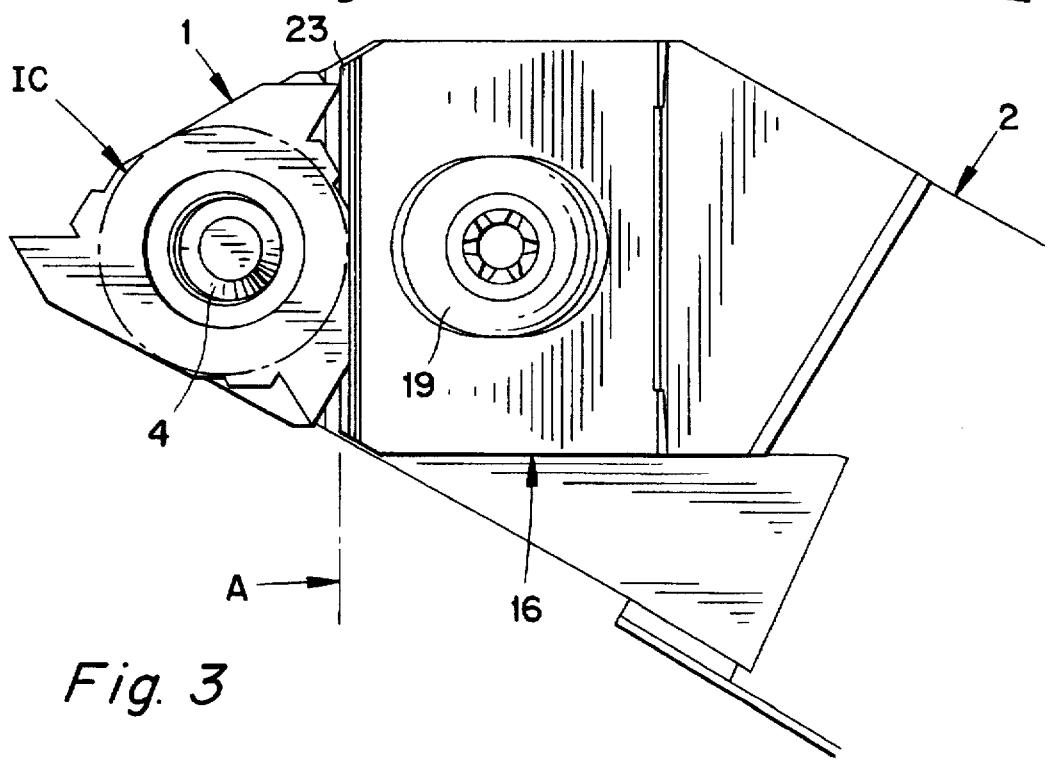
FIG. 3 shows a top side of the embodiment according to FIG. 1.

The insert has a central through hole 3, whose geometry may be seen more clearly in FIG. 2. Into this central hole extends a central pin 4, whose lower end is introduced into a boring 5 in the holder. In principle, the central pin and the boring 5 may be smooth. However, preferably, the central pin is provided with a lower threaded portion 12, the boring 5 of course then also being shaped with a corresponding thread.

The bottom support surface 1A of the cutting insert can be directly supported on the surface 34, but primarily in order to protect the holder, usually a shim 6 is placed between the cutting insert and the holder, whereby the insert is indirectly supported by the surface 34. In order to stabilize the shim 6, the holder 2 is shaped with an abutment shoulder 7.

In order to fasten the shim, the central pin 4 can be provided with a collar 8 that abuts against a cooperating ring-shaped shoulder 9 in the shim's through hole 10.

In order to simultaneously give the central pin on the one hand an axial bottom position and on the other hand to stiffen it up, it is formed with a diameter decrease, whereby an upper smooth cylindrical portion 11 has a larger diameter than the lower cylindrical portion 12, the latter being threaded, as mentioned above. Also the boring 5 is shaped in a corresponding way. Further, the boring 5 can be a through-bore, so that the central pin can be pushed up and/or be rotated from underneath, respectively. For the latter purpose, the central pin can be provided with a non-circular recess 13, for instance a hexagonal recess for receiving a so-called hexagon key. Of course, also the upper end surface of the central pin can be provided with a recess corresponding to recess 13.

In order to secure the cutting insert axially (i.e., in the axial direction of the central pin 4), the pin can include a collar 8, and the envelope surface 14 of the central pin above the collar 8 can be shaped as a downwardly tapering frustocone. The apex angle α of this cone part may vary within relatively wide ranges, the cooperating part 15 of the insert hole also being capable of varying correspondingly. Generally, the larger α is, the safer becomes the axial locking of the cutting insert. For instance, α can vary between 1° and 40°, more preferably between 2° and 20° and most preferably between 3° and 12°.

In order to simplify the installing of the cutting insert upon the center pin, the top of the latter can advantageously be shaped with an upward taper. Thus, according to the illustrated embodiment, the top part of the center pin has been shaped as a frustocone 32.

Since the upper part of the center pin must be capable of being introduced into the insert hole 3, the maximum diameter of the upper part of the center pin, i.e., the part located above the collar 8, is smaller than the minimum diameter of the insert hole (which is usually the diameter of the lower end of the hole). The minimum diameter of the insert hole is usually between 2 and 10 mm, more preferably between 3 and 7 mm. Thereby, a gap G is formed between the center pin and the insert hole in a direction towards the operative cutting insert corner. At a part of the insert hole diametrically opposed to this gap, the center pin is contacted by the wall 15 of the insert hole, a portion 15A of which is preferably radiused, as may be seen in longitudinal section (FIG. 2). This pressure is brought about by activation of a clamping wedge 16, which has a novel shape.

In the case of triangular cutting inserts, the ratio between the magnitude of the diameter of the inscribed circle IC (the so-called IC-measure, in mm) of the cutting insert and the smallest diameter of the insert hole is suitably between 1.5 and 3.0, more preferably between 2.0 and 2.7.

The clamping wedge 16 has a substantially parallelepiped basic shape, comprising a front contact or flank surface 17 and a rear contact or flank surface 18. The rear flank surface is preferably rounded from top to bottom, i.e., as viewed in longitudinal section, and is axially angled. It is shaped that way in order to be capable of abutting against and traveling along the planar rear portion 20 of the wedge support surface of the holder while making line contact therewith. Suitably, this surface 20 is angled obtusely to the support surface portion 21 of the holder by an angle β of between 6520 and 85°, and more preferably between 70° and 80°. In this way, the clamping wedge is laterally displaced toward the insert 1 when the fastening screw 19 is tightened and clamps the insert against the center pin 4. In order to obtain a uniform and concentrated pressure against the insert, the front flank surface 17 of the clamping wedge is shaped with an elongated, protruding pressing bulge 22, that presses against the adjacent flank surface of the insert 1.

Figure 6:
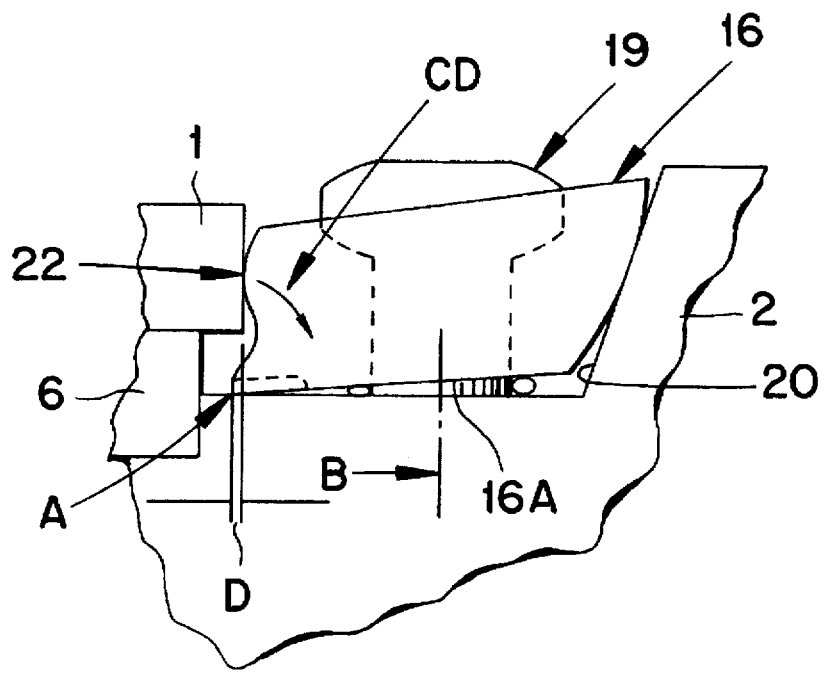
FIG. 6 is a fragmentary side elevational view of the embodiment according to FIG. 1.

According to the present invention, the bottom portion of the front flank surface 17 of the clamping wedge comprises an elongated, protruding "lip" or support heel 23 whose lower edge 23A defines a pivot axis A for the clamping wedge. That axis A is located closer to the axis of the pin 4 than the line of contact between the insert and the bulge 22. That is, the axis A is spaced forwardly from such line of contact by a distance D (see FIG. 6). During tightening of the screw 19, the clamping wedge 16 is pushed downwardly toward the front portion 21 of the wedge-support surface and engages the rear portion 20 which displaces the wedge 16 laterally toward the central pin 4 (.e., toward the left in FIG. 6). Hence, the bulge 22 of the wedge contacts the insert 1 and pushes the insert against the pin 4. Eventually, the lower edge of the heel 23 contacts the surface 21 as shown in FIG. 6, with the rest of the bottom surface 16A of the wedge being spaced above that front portion 21 (that bottom surface 16A is inclined, i.e., it forms an obtuse angle with respect to a center axis B of a through-hole 24 of the wedge, as can be seen in FIG. 6). Final tightening of the screw 19 then causes the wedge to pivot about that edge, i.e., to pivot about axis A, in a clockwise direction CD shown in FIG. 6. Such a pivotal movement causes the bulge 22 to be displaced slightly downwardly during the tightening. Thus, besides a lateral motion of the clamping wedge 16 relative to the insert, a tightening of the locking screw 19 will also result in a downwardly directed displacement of the pressing bulge 22, contrary to, e.g., SE-C-367 332. However, this downward displacement will be minimal and does not cause any lifting-up of the front part of the cut cutting insert, i.e., of the operative insert corner.

As the bulge 22 rotates in the clockwise direction CD, the wedge 16 will continue to be displaced to the left in FIG. 6 until a final position is reached. Thus, when tightening up the clamping wedge 16 by dynamometric tightening of the fastening screw 19, the contact line between the cutting insert and the pressing bulge 22 will describe a motion downwardly/forwardly (thus, downwards and to the left in FIG. 2). Thereby, a good contact at the rear part of the insert is guaranteed. Further, preferably said contact line between the insert and bulge 22 is located above (higher than) the contact point between the center pin 3 and the insert hole 3 by a distance h (see FIG. 5), which results in a moment that forces the operative cutting corner downwards. This moment should amount to a magnitude that brings balance into the system, so that contact is guaranteed with the whole support surface of the insert. Thus, the relation between D and the other measures of the clamping wedge should not be exaggerated, which may lead to the force directed vertically downwards between the pressing bulge 22 and the insert becoming too large and to the operative insert corner being lifted up. Suitably, the ratio h/D is between 1.5 and 6.0, more preferably between 2 and 5 and most preferably between 2.5 and 4.0.

Further, the ratio between the smallest diameter of the insert hole and the distance h should be between 2 and 10, more preferably between 3 and 8.

Figure 7:
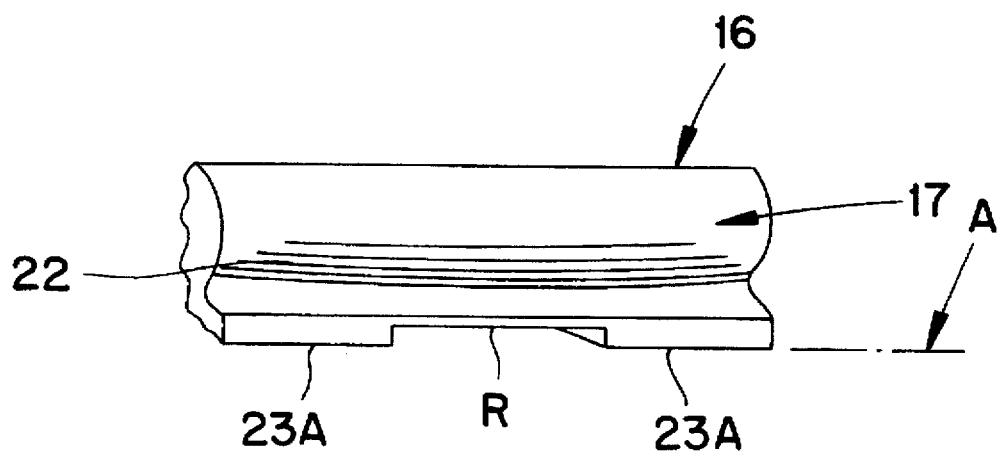
FIG. 7 is a perspective view of a clamping wedge according to the invention.

In order to ensure a good contact between the surface 21 and the lower edge 23A of the heel 23, that lower edge 23A is recessed at R between its ends, as shown in FIG. 7, whereby the length of the edge 23A that must make contact with the surface 21 is reduced. This facilitates the ability of the insert to make line contact with the surface 21.

If a clamping arrangement without any shim 6 is used, a recess can be formed (e.g., by pressing or grinding) in the lower part of the insert, facing the clamping wedge, in order to receive the support heel 23, since as noted earlier, the support heel 23 extends closer to the central axis of the insert hole 3 than does the pressing bulge 22.

In order to make possible a lateral displacement of the clamping wedge in the direction of the cutting insert 1, the center hole 24 of the clamping wedge is not entirely circular but rather is somewhat oblong. Moreover, the upper part of the center hole 24 is enlarged relative to the lower part of the hole, whereby the head of the fastening screw 19 can be countersunk. Thereby, it is inter alia avoided that a protruding screw head disturbs the chip flow. A shoulder 26,27 formed at the enlargement functions as a support surface for the underside of the screw head. Since a statically well defined and distinct abutment should be guaranteed at different inclinations of the clamping wedge, this shoulder is preferably shaped in a special way. Thus, this shoulder comprises a front part 26 directed towards the flank surface 17, which part constitutes the very contact part and upon which the abutment surface or point with the screw head is located. Further, said shoulder comprises a rear part 27 directed towards the rear flank surface 18, which part constitutes a free surface that does not come into contact with the screw head. Alternatively, these parts 26,27 may be reversed, so that the screw head presses against the rear part of the hole shoulder instead, and the front shoulder part constitutes a free surface.

In order to simplify the handling of the clamping wedge 16 during mounting and demounting, a helical spring 28 is disposed around the fastening screw 19 and fitted upwardly into an enlarged lower opening portion in the clamping wedge, whereby the spring at its lower end rests against a shoulder 30 in the boring 29 in the insert holder. In this way, the clamping wedge 16 is biased upwardly and is caused to join the initial upward motion of the fastening screw 19 when it is untightened, and thus simplifies the accessibility and handling of the clamping wedge.

The fastening screw 19 may be provided with rotation-asymmetrical (non-circular) recesses 31, 31', both at the top and at the bottom, in order to make possible an activation of the screw both from above and from underneath (the latter of course being possible only when the hole 29 is a through-hole). Further, because of manufacturing reasons, the fastening screw 19 can be shaped with a waist-part 33 that simplifies the production of the thread of the screw.

Figure 4:
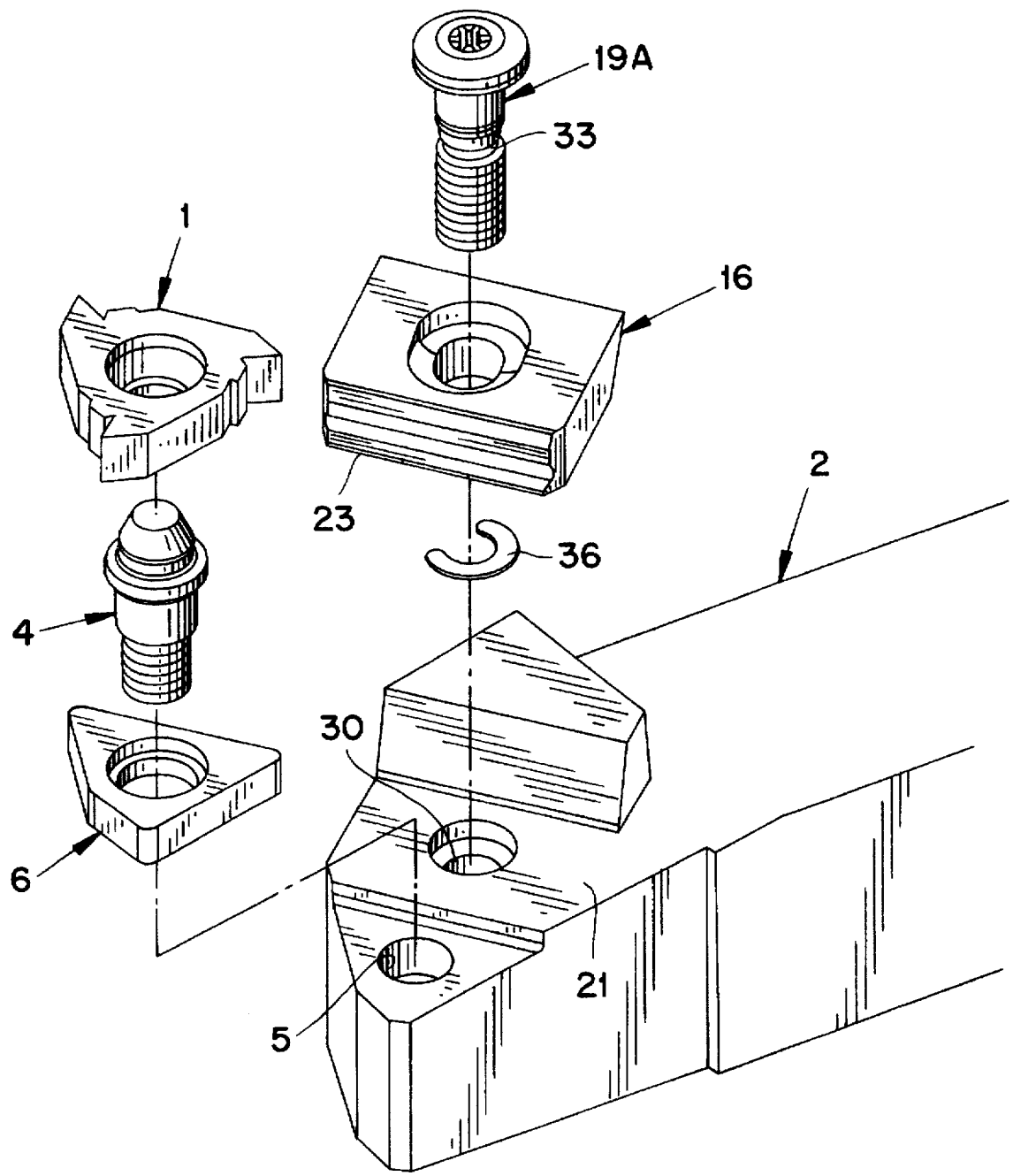
FIG. 4 shows an exploded view of an embodiment that is somewhat modified relative to FIG. 1.
Figure 5:
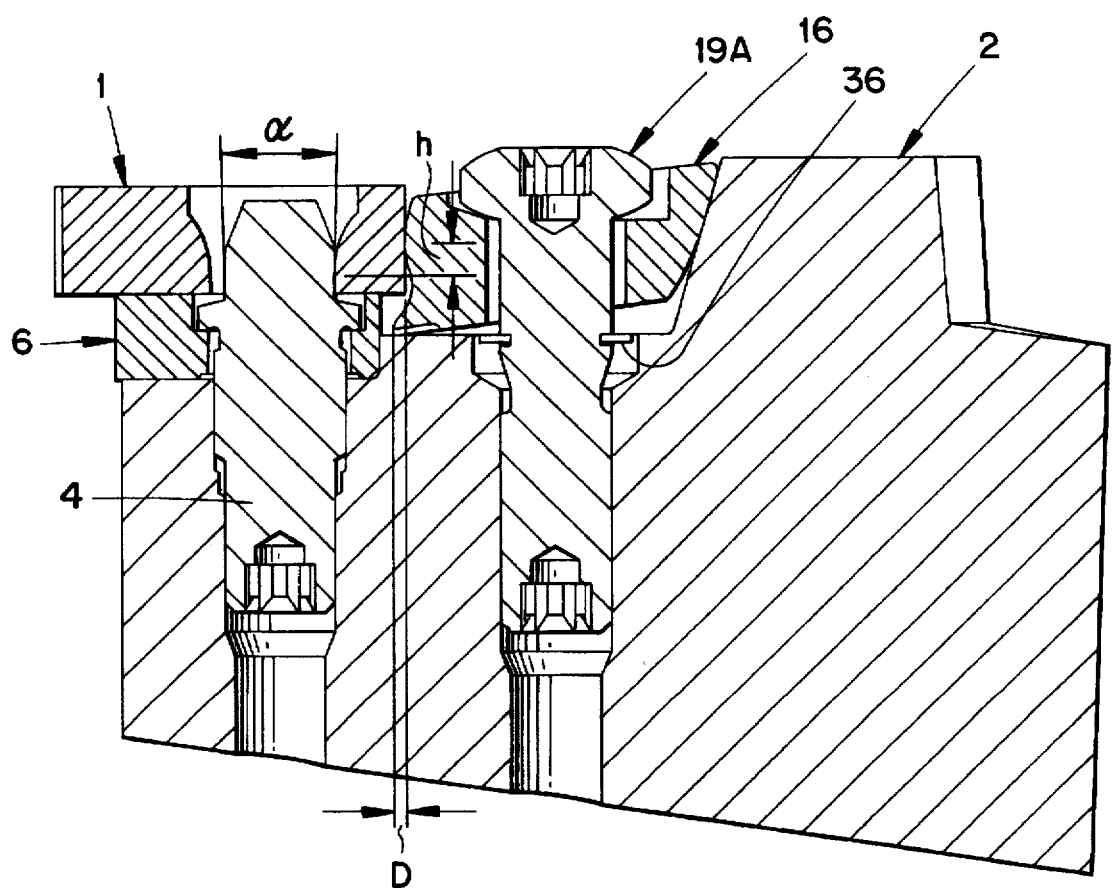
FIG. 5 shows a cross-section of the embodiment according to FIG. 4 taken along a plane containing the central axes of the two locking pins.

Instead of being provided with the helical spring 28, the fastening screw could instead be provided with a locking washer 36 in accordance with FIGS. 4 and 5, which is mounted in the screw's waist-part 33. The essential difference in comparison with the helical spring 28 is that the washer 36 locks the fastening screw 19 to the clamping wedge 16, so that the clamping wedge can be removed by pulling the loosened fastening screw.

Primarily by the construction of the above described clamping wedge, a hitherto unattained, equiform contact has been obtained, by which the risk of a tipping of the cutting insert at its front or rear has practically been eliminated.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A tool holder for cutting inserts, comprising:

a body forming an insert-support surface adapted to support a cutting insert, and a wedge-support surface adapted to support a wedge;

the wedge-support surface including a front portion disposed adjacent the insert-support surface, and a rear portion extending upwardly at an obtuse angle relative to the front portion;

a pin projecting upwardly from the insert-support surface and adapted to enter a through-hole of a cutting insert, the rear portion of the wedge-support surface facing generally toward the pin; and a wedge supported by the wedge-support surface and including a through-hole receiving a fastening screw which secures the wedge to the front portion of the wedge-support surface, the wedge including a rear contact surface abutting the rear portion of the wedge-support surface to cause the wedge to be displaced toward the pin when the fastener screw is tightened, the wedge including a front contact surface disposed opposite the rear contact surface, the front contact surface including an insert-engaging portion for abutting and pushing an insert against the pin, the front contact portion also including a supporting heel for abutting the front portion of the wedge-support surface at a location which is disposed closer to an axis of the pin than is the insert-engaging portion.

2. The tool holder according to claim 1, wherein the insert-engaging portion comprises a curved bulge.

3. The tool holder according to claim 1, wherein the supporting heel includes a lower edge abutting the front portion of the wedge-support surface, the lower edge including a recess.

4. The tool holder according to claim 1, wherein the pin includes a portion that becomes wider in an upward direction and adapted to engage a correspondingly shaped portion of an insert hole.

5. The tool holder according to claim 1, wherein the rear contact surface of the wedge is rounded from an upper portion thereof to a lower portion thereof to make line contact with the rear portion of the wedge-support surface.

6. The tool holder according to claim 1 further including a spring biasing the wedge upwardly.

7. The tool holder according to claim 1, further including a lock washer mounted on the fastening screw beneath the wedge for applying an upward force to the wedge upon removal of the fastening screw.

8. A tool holder in combination with a cutting insert having a through-hole, the tool holder comprising:

a body forming an insert-support surface adapted to support a cutting insert, and a wedge-support surface adapted to support a wedge;

the wedge-support surface including a front portion disposed adjacent the insert-support surface, and a rear portion extending upwardly at an obtuse angle relative to the front portion;

a pin projecting upwardly from the insert-support surface and entering the through-hole of the cutting insert, the rear portion of the wedge-support surface facing generally toward the pin; and a wedge supported by the wedge-support surface and including a through-hole receiving a fastening screw which secures the wedge to the front portion of the wedge-support surface, the wedge including a rear contact surface abutting the rear portion of the wedge-support surface to cause the wedge to be displaced toward the pin when the fastener screw is tightened, the wedge including a front contact surface disposed opposite the rear contact surface, the front contact surface including an insert-engaging portion for abutting and pushing the cutting insert against the pin, the front contact portion also including a supporting heel for abutting the front portion of the wedge-support surface at a location which is disposed closer to an axis of the pin than is the insert-engaging portion; the wedge bearing against the insert at a location situated above a location where the insert contacts the pin.

* * * * *